(12) United States Patent
Guo et al.

(10) Patent No.: US 6,660,989 B2
(45) Date of Patent: Dec. 9, 2003

(54) CMOS IMAGER HAVING ASYNCHRONOUS PIXEL READOUT IN ORDER OF PIXEL ILLUMINATION

(75) Inventors: Xiaochuan Guo, Gainesville, FL (US); Zhiliang Julian Chen, Plano, TX (US); John G. Harris, Gainesville, FL (US)

(73) Assignee: Texas Instruments Incorporated, Dallas, TX (US)

( * ) Notice: Subject to any disclaimer, the term of this patent is extended or adjusted under 35 U.S.C. 154(b) by 9 days.

(21) Appl. No.: 10/190,785

(22) Filed: Jul. 8, 2002

(65) Prior Publication Data

US 2003/0015647 A1 Jan. 23, 2003

Related U.S. Application Data

(60) Provisional application No. 60/322,250, filed on Sep. 10, 2001, and provisional application No. 60/304,637, filed on Jul. 11, 2001.

(51) Int. Cl.[7] .............................................. H04N 5/335
(52) U.S. Cl. ..................... 250/208.1; 348/308
(58) Field of Search ....................... 250/208.1; 348/308, 348/241

(56) References Cited

U.S. PATENT DOCUMENTS 5,565,915 A * 10/1996 Kindo et al. ............... 348/308
5,798,847 A * 8/1998 Aerts ......................... 358/464
6,067,113 A * 5/2000 Hurwitz et al. ............. 348/241
6,229,133 B1 * 5/2001 Hynecek ................. 250/208.1
6,330,030 B1 * 12/2001 O'Connor .................. 348/297
6,515,702 B1 * 2/2003 Yadid-Pecht et al. ....... 348/308
6,525,304 B1 * 2/2003 Merrill et al. ........... 250/208.1

* cited by examiner

Primary Examiner—Stephone Allen
(74) Attorney, Agent, or Firm—Robert D. Marshall, Jr.; W. James Brady, III; Frederick J. Telecky, Jr.

(57) ABSTRACT

This CMOS imager represents illuminance in the time domain. Once per frame, each pixel outputs a pulse after a time proportional to the illuminance on that pixel. Therefore, the illuminance on that pixel is related to the time difference between its pulse event and global reset of the imager. A counter reports the times of these pulse events in a digital format. Thus no analog to digital converter is necessary. This imager enables easy computation of pixel intensity histograms. Frame data is stored in pixel intensity order using row and column arbiters to produce a pixel address. Because each pixel has its own exposure time, the imager has a wide dynamic range of 120 dB. This imager has low power dissipation and avoids the noise and mismatch problems of prior complicated analog readout circuits.

13 Claims, 4 Drawing Sheets

CMOS IMAGER HAVING ASYNCHRONOUS PIXEL READOUT IN ORDER OF PIXEL ILLUMINATION

This application claims priority under 35 USC §119(e)(1) of Provisional Application Number 60/322,250, filed Sep. 10, 2001 and claims priority under 35 USC §119(e)(1) of Provisional Application Number 60/304,637, filed Jul. 11, 2001.

TECHNICAL FIELD OF THE INVENTION

The technical field of this invention is CMOS imaging devices having high dynamic range.

BACKGROUND OF THE INVENTION

Charge-coupled devices (CCDs) have been the basis for solid-state imagers for many years. However, during the past ten years, interest in CMOS imagers has increased significantly. CMOS imagers are capable of offering System-on-Chip (SOC) functionality, lower cost, and lower power consumption than CCDs.

Dynamic range is one of the most important performance criteria of image sensors. It can be defined as the ratio of the highest illuminance to the lowest illuminance that an imager can measure and process with acceptable output quality. The dynamic range of conventional CMOS imagers is usually limited to about 60 dB because the photodiode has a nearly linear response and all pixels have the same exposure time. However, many scenes can have a dynamic range of more than 100 dB.

One way to improve dynamic range is to use the logarithmic response of a MOS transistor in the sub-threshold region. However, the signal-to-noise ratio (SNR) with this method is poor. Another method is to adjust the photodiode's well capacity. This technique can achieve high dynamic range of 96 dB. However, the SNR of this scheme is also poor. Multiple sampling is another method of increasing the dynamic range of imagers. Due to the linear nature of multiple sampling, either ultra-fast readout circuits or very long exposure times are required. In order to achieve a dynamic range of about 120 dB, the imager needs exposure times as long as six seconds. Obviously, this is not feasible for video mode operation. Furthermore, multiple sampling requires each pixel's values to be read off multiple times in one frame. This can lead to high power consumption.

Researchers recently reported a CMOS imager that achieves a dynamic range of 120dB by representing illuminance in the time domain. Pixels output pulse events, with a brighter pixel outputting more pulse events than a darker pixel. This process is continuous because, in contrast with conventional imagers, there is no global imager reset that signifies the start of a frame. When a pixel emits a pulse event, the imager outputs that pixel's address using address event readout circuits. The scene is reconstructed by measuring how frequently the pixels output pulse events. Therefore, the times of the past pulse events of the pixels must be stored in a large memory. Additionally, bright pixels may output many pulse events over a short period of time, so the load on the arbiter may become large.

SUMMARY OF THE INVENTION

An image sensor includes a plurality of pixel cells disposed in a two dimensional array. Each pixel cell includes a photodiode and a comparator circuit. The comparator compares the photodiode voltage with a common reference voltage. Upon a match the comparator circuit generates a comparator pulse supplied to a corresponding row line. A row arbiter detects when a row line receives a comparator pulse from a pixel in said corresponding row. This row arbiter generates a row signal indicative of the row, selecting a single row if more than one row line receives a comparator pulse simultaneously. The row arbiter enables the comparators of pixels in the selected row to send the comparator pulses to corresponding column lines. A column arbiter detects when a column line receives a comparator pulse from a pixel in the corresponding column and generates a column signal indicative of the column. The column arbiter selects a single column if more than one column line receives a comparator pulse simultaneously. The time of arrival of a comparator pulse indicates the illumination level of the corresponding pixel.

The image sensor preferably includes a row encoder and a column encoder. The row encoder receives the row signal and generates a multi-bit digital row signal indicative of the row. The column encoder receives the column signal and generates a multi-bit digital column signal indicative of the column.

The optimum contour of the common reference voltage depends upon the particular application. The common reference voltage is a voltage ramp in the simplest case. The reference voltage monotonically changes from a voltage indicative of maximum illumination at a time corresponding to a minimum exposure time to a voltage just above a signal to noise ratio at a time corresponding to a maximum exposure time.

BRIEF DESCRIPTION OF THE DRAWINGS

These and other aspects of this invention are illustrated in the drawings, in which.

DETAILED DESCRIPTION OF PREFERRED EMBODIMENTS

The imager of this invention represents illuminance in the time domain in a different way. The illuminance on a pixel is transformed into a pulse event. This pulse event can only occur once per pixel per frame, in the time domain. The imager's global reset occurs at the start of a frame. A brighter pixel's pulse event occurs before a darker pixel's pulse event following reset. These temporal pulse events can be used to reconstruct the scene while maintaining a wide dynamic range and performing smart functions, such as histogram equalization and scene segmentation. Address event readout circuits output the pulse events with the corresponding pixel addresses. The basic pixel design of a photodiode connected to a comparator with a universal reference voltage results in each photodiode avoiding saturation by having its own unique exposure time.

The prior art pulse event imager represents illuminance in the time differences between pulse events for the same pixel. The imager of this invention represents illuminance in the time difference between a pixel's pulse event and the global reset. Therefore, the imager of this invention does not require a large frame memory because only one pulse event per pixel per frame is necessary to reconstruct the scene. Furthermore, the load on the arbiter is reduced because each pixel only has one pulse event per frame.

Figure 1:
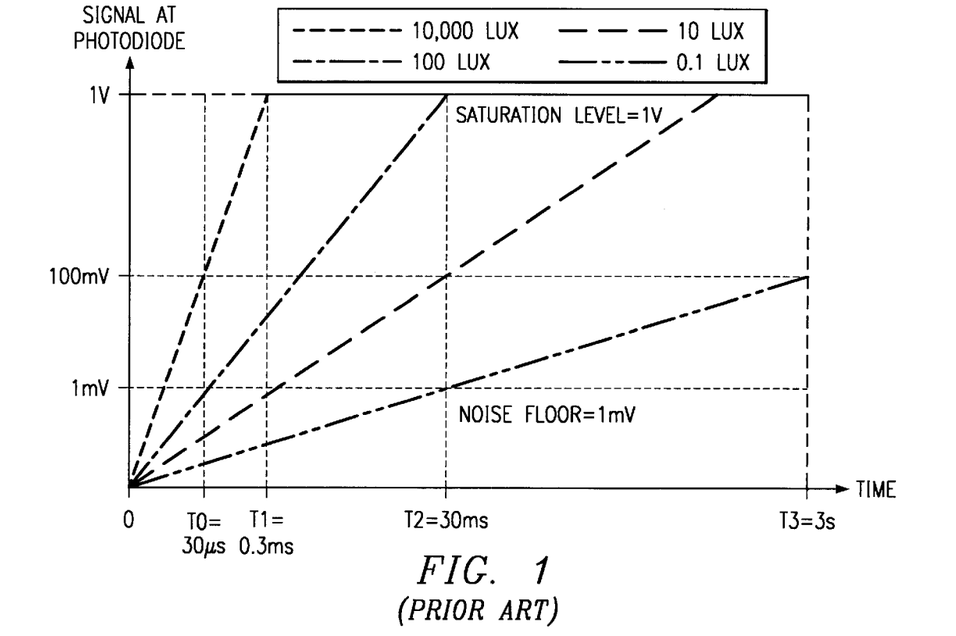
FIG. 1 illustrates the typical response of photodiodes of prior art CMOS imagers under various illuminations.

FIG. 1 illustrates the typical response of photodiodes of CMOS imagers under various illuminations. The fundamental factors limiting the dynamic range of conventional CMOS imagers are the nearly linear response of the photodiodes and an exposure time that is the same for all pixels. Since photodiodes in most CMOS imagers operate in integration mode, the signal level across each photodiode increases with time at a rate proportional to the illuminance on that photodiode. After a predetermined exposure time that is the same for all pixels, the analog signal level across each photodiode is read out.

As an example to illustrate the dynamic range limitations of this scheme, assume the imager has a signal saturation level of 1 volt. This signal saturation level is set by the supply voltage and the readout circuits. Also assume the noise floor is 1 millivolt RMS. This is typical for a CMOS imager. The noise floor is determined by the thermal noise of the reset transistor, readout circuits and the shot noise associated with the dark current of the photodiodes.

Referring to FIG. 1, for a fixed exposure time for all pixels and assuming the minimum acceptable SNR is 1 (0 dB), the maximum dynamic range is 1,000 (60 dB). For example, if the integration time is T1 (0.3 milliseconds), the system loses information for pixels with illuminance below 10 lux due to the noise floor and above 10,000 lux due to saturation. If the integration time is T2 (30 ms) the system captures information about pixels with illuminance as low as 0.10 lux, but pixels with illuminance above 100 lux are saturated. Thus the dynamic range is still 60 dB.

Figure 2A:
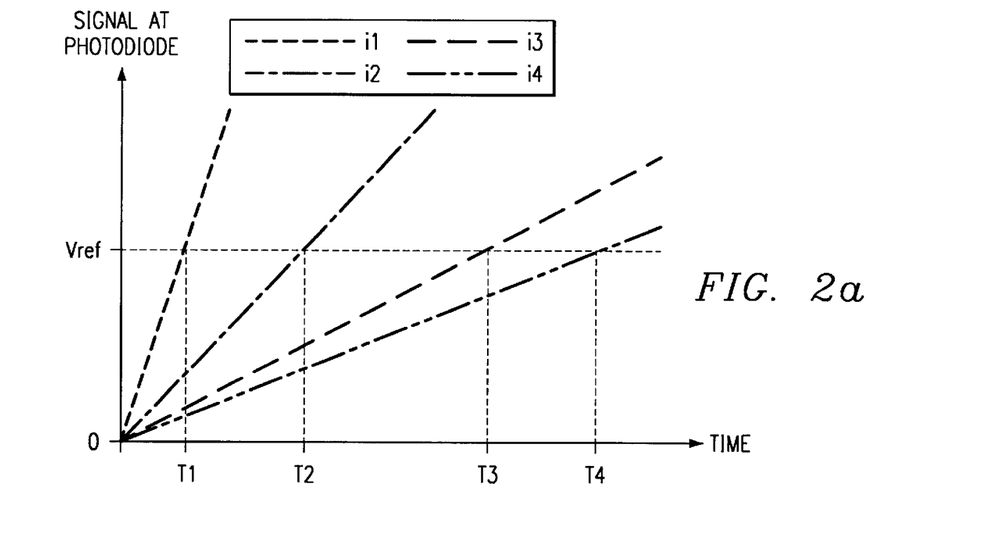
FIG. 2 illustrates how the imager of this invention achieves a wide dynamic range.
Figure 2B:
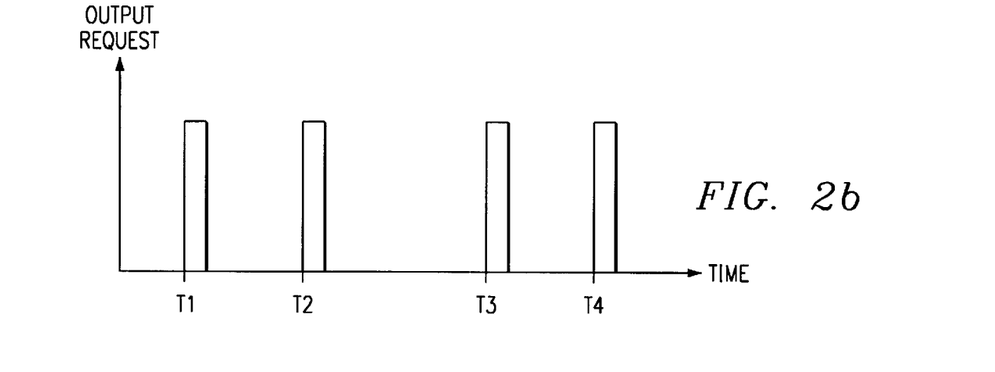

FIG. 2 illustrates how the imager of this invention achieves a wide dynamic range. In FIG. 2 four pixels are located at addresses m1,n1), (m2, n2), (m3, n3) and (m4, n4), with respective illuminances of i1, i2, i3 and i4. Instead of reading out the analog voltage across each photodiode at a predetermined exposure time, each photodiode has a comparator for the corresponding pixel. FIG. 2a shows the linear voltage accumulation of the four photodiodes. When the voltage on a photodiode drops below the reference voltage that is the same for all pixels, the corresponding comparator inverts. That pixel then generates a pulse, as shown in FIG. 2b. After a pixel has fired, it is disabled for the rest of the frame. The time at which a pixel fires indicates the illuminance on that pixel. For example, if the illuminance I(k) at pixel k is k times larger than the unit illuminance I0 and T corresponds to the frame time, we get:

$$I(k)t_k = k \times I0 \times t_k = I0 \times T \qquad (1)$$

$$k = \frac{T}{t_k} \qquad (2)$$

So, for two pixels at addresses (m1,n1) and (m2,n2) with illuminance i1 and i2 that fire at times t1 and t2, respectively, we have the following relationship:

$$\frac{i1}{i2} = \frac{t2}{t1} \qquad (3)$$

Figure 2C:
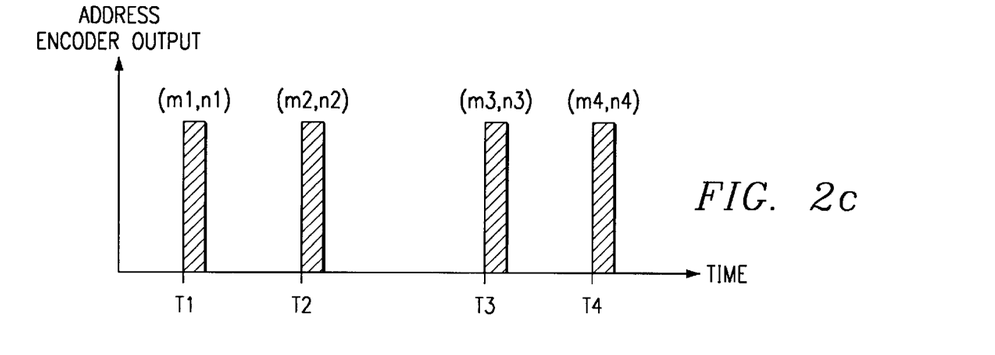

Thus, the illuminance can be determined from the time domain information. This invention replaces the analog-digital converter (ADC) required for conventional imagers to output digital values, with a counter that reports the time when each pixel fires. As shown in FIG. 2c, the imager also reports to the receiver the addresses of the pixels as they fire.

Figure 3:
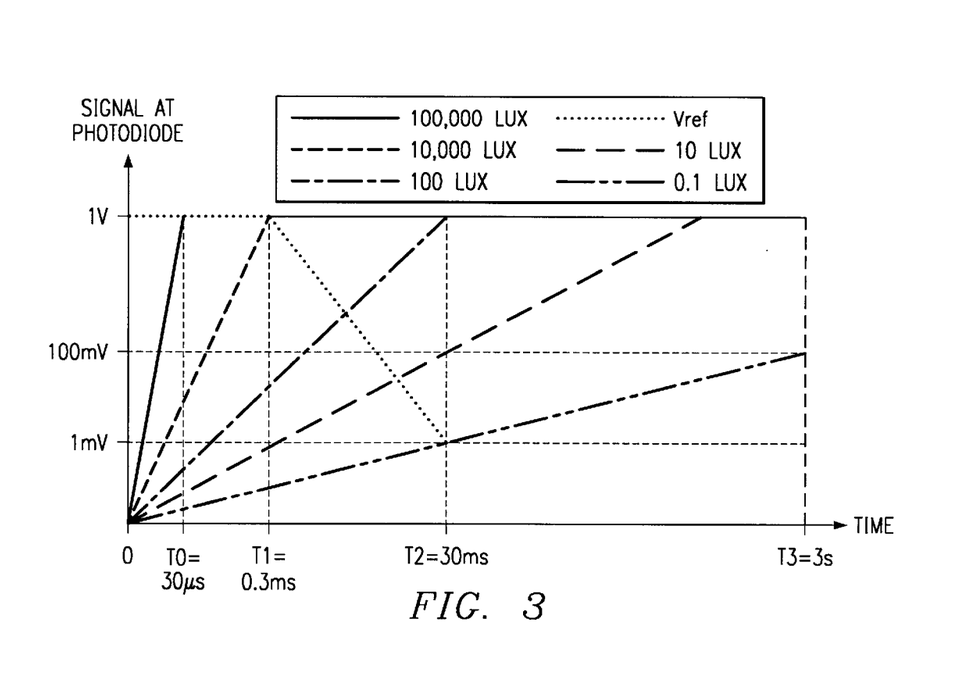
FIG. 3 illustrates how an example of a variable reference voltage used to achieve a wide a dynamic range.

FIG. 3 illustrates an example of how wide a dynamic range such an imager can achieve. Suppose the imager operates in video mode with a frame time T of 30 ms and the minimum resolvable time t(k) is 0.03 us. From equation 2, the imager achieves a dynamic range of 120 dB. If the imager operates in a still image mode in which the exposure time T is longer than 30 ms, the dynamic range is even greater.

The above example shows that the dynamic range of the imager depends on the minimum time it can resolve and the frame time. If these two factors place an unacceptable limit on the dynamic range of the imager, this dynamic range can be increased by appropriate varying of the reference voltage. Under room light conditions, the illuminance may not be strong enough to cause many pixels to fire within a frame with a constant, high reference voltage. By varying the reference voltage, the imager can guarantee that these pixels fire.

FIG. 3 illustrates the principle of this idea. Assume a set reference voltage of 1 V, a frame time T2 of 30 ms and a minimum resolution time T0 of 30 us. Any pixel below 100 lux does not fire before the end of the frame. The imager cannot process and output valid data about such a pixel. However, if the reference voltage is swept downward from 1 V to 1 mV as shown by the dotted line, pixels as low as 0.1 lux will fire by the end of the frame. The imager can output pixel firing data. The pixel firing data along with the known reference voltage at that time, enables determination of the illuminance of that pixel. Therefore, the dynamic range of the imager has been increased from 60 dB to 120 dB. The disadvantage of performing this operation is that the pixels with an illuminance below 10,000 lux will now fire at a lower signal level. Thus these pixels will have a lower SNR than the pixels that fired when the reference voltage was higher. However, conventional imagers also suffer from a degraded SNR for pixels at low illuminance levels without the advantage of an increased dynamic range.

Figure 4:
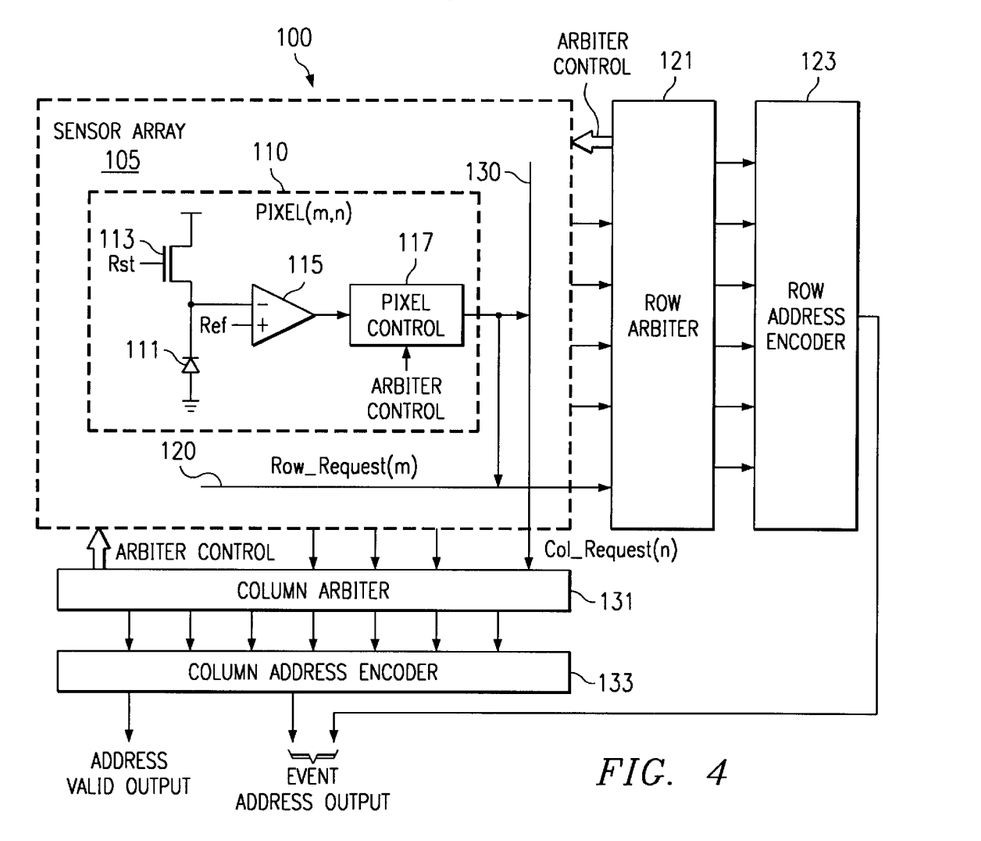
FIG. 4 illustrates the imager of this invention in block diagram form.

FIG. 4 illustrates imager 100 in block diagram form. Each pixel 110 in sensor array 105 includes a photodiode 111, a reset transistor 113, a comparator 115 and a pixel control block 117. Row arbiter 121 and column arbiter 131 resolve conflicting pixel firings. Row address encoder 123 and column address encoder 133 output the digital pixel addresses. In order to increase the speed at which imager 100 can output pulse events and the corresponding pixel addresses, all circuits preferably operate asynchronously without a global clock.

Imager 100 operates as follows. The time varying reference voltage illustrated in FIG. 3 is supplied to the reference input of each comparator 115. When the voltage across photodiode 111 of a particular pixel drops below the reference voltage of the corresponding comparator 115, pixel control block 117 pulls down Row_Request line 120. This Row_Request line 120 is shared by all pixels 110 on the same row. Row arbiter 121 resolves any conflicts that occur when two or more rows make a request simultaneously. Row arbiter 121 selects one particular row and enables the pixels that have fired in that row to send requests to the column arbiter by pulling down the corresponding Col_Request line 130. Row address encoder 123 places the selected row's address in a latch. Rows making requests on Row_Request line 120 and not immediately selected by row arbiter 121, will be deferred and reconsidered in a next resolvable time interval of row arbiter 121. If row arbiter 121 simultaneously receives request signals from three or more rows, some row requests will be deferred repeatedly. Row arbiter 121 continuously arbitrates among received row requests for the whole frame interval ensuring each firing row is accepted and acknowledged.

Column arbiter 131 is necessary because it is possible that more than one pixel fired simultaneously in the selected row. Column arbiter 131 operates similarly to row arbiter 121 described above. When column arbiter 131 selects one particular column, imager 100 sends out the column and row addresses along with an output address valid pulse to indicate that there is a valid address output. After imager 100 outputs the address of a pixel, pixel control block 117 of that pixel disables it from pulling down Row_Request line 120 and Col_Request line 130 for the remainder of the frame.

Row arbiter 121 and column arbiter 131 may be implemented by any technique that selects one signal among simultaneously received signals while delaying servicing of other simultaneously received signals. The inventors believe the technique described in U.S. Pat. No. 5,404,556 entitled "Apparatus for Carrying Out Asynchronous Communication among Integrated Circuits" is suitable for embodying row arbiter 121 and column arbiter 131 and their relationship to the function of control block 117 that disables the pixel for the remainder of the frame.

With the exception of comparator 115, all of the circuits are digital. Therefore, imager 100 avoids the noise and mismatches associated with the analog readout circuits in conventional CMOS imagers.

One potential problem with imager 100 may occur when many pixels are under uniform illumination. These pixels will fire at exactly the same time absent any comparator offsets. Their corresponding output address pulses must occur at different times since imager 100 can output only one pixel address at a time. The minimum difference in time between such pixels depends on the speed of row arbiter 121 and column arbiter 131. Since the temporal position of address pulses represents illuminance, some errors are introduced. The following example shows that these errors are acceptable for medium-sized imagers.

Assume that for a QCIF (144 by 176 pixel array) image, 10% of the pixels are under exactly the same illuminance. Simulation results show the average address output cycle time is 7.5 ns. This estimate is only valid for the QCIF format assuming a worst-case distribution of the uniformly illuminated pixels. Therefore, it takes 144×176×(10%)×7.5 ns or 19 $\mu$s to output all of these pixels. Additional assumptions allow translation of this time into an error in the digital pixel value. Assume that the frame time is 30 ms, the pixel values are represented by an 8 bit digital number and the uniformly illuminated pixels are near the median of the illuminance range defined by the brightest pixel and the darkest pixel. When the proper reciprocal relationships between illuminance and time are taken into account, we find that 19 $\mu$s corresponds to a maximum error of 8% in the digital values of the pixels under uniform illumination. However, if uniformly illuminated pixels are in the darkest range of the pixels, the maximum digital pixel value error decreases to 0.1% due to the reciprocal mapping from illuminance to the time domain.

Figure 5:
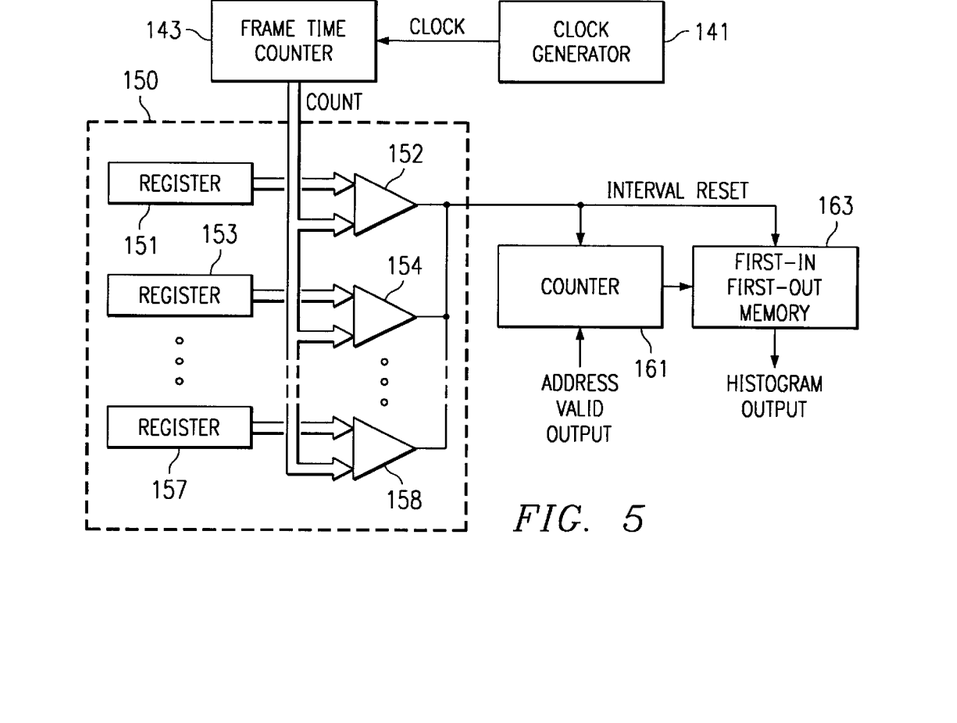
FIG. 5 illustrates example hardware forming a pixel intensity histogram from the data of the imager of FIG. 4.

As shown in FIG. 2, imager 100 outputs pixels according to their amplitude. FIG. 5 illustrates example hardware to perform a histogram function. Clock generator 141 generates clock pulses supplied to frame time counter 143. Frame time counter 143 starts at the beginning of each frame exposure interval. The frame time count output of frame time counter 143 indicates relative time position within the frame exposure interval. Upon reaching a full counter corresponding to the end of the frame exposure interval, frame time counter 143 resets. As explained above, pixels fire in order of pixel intensity from greatest intensity to least intensity. Histogram interval timer 150 selects time intervals within the frame exposure interval corresponding to desired pixel intensity bands. Upon expiration of each histogram time, histogram interval timer 150 generates an interval reset signal. Histogram interval timer 150 may take the form of a plurality of programmable registers 151, 153 and 157, and corresponding comparators 152, 154 and 158. Each comparator 152, 154 and 158 compares the frame time count with its corresponding programmable register 151, 153 and 157. When the frame time count equals the count stored in a programmable register, the corresponding comparator generates an interval reset signal. The interval reset signal outputs of the comparators are connected in a wired OR configuration for the output of histogram interval timer 150. If the registers 151, 153 and 157 store differing counts, only one comparator 152, 154 or 158 will fire at a time.

Imager 100 produces an event address output and an address valid output upon each firing of a pixel within sensor array 110. Counter 161 counts the number of address valid outputs received during each histogram interval. Upon an interval reset signal from histogram interval timer 150, counter 161 loads its count into the input of first-in-first-out memory 163. Following each frame exposure interval, first-in-first-out memory 163 stores a series of counts, each equal to the number of pixels firing during a corresponding histogram interval. This is a histogram of pixel intensity. Therefore, it is easy to obtain a histogram of the frame. With the histogram, the temporal information, and the pixel addresses, image processing applications such as histogram equalization, region segmentation and adaptive dynamic range imaging are easy to perform.

Figure 6:
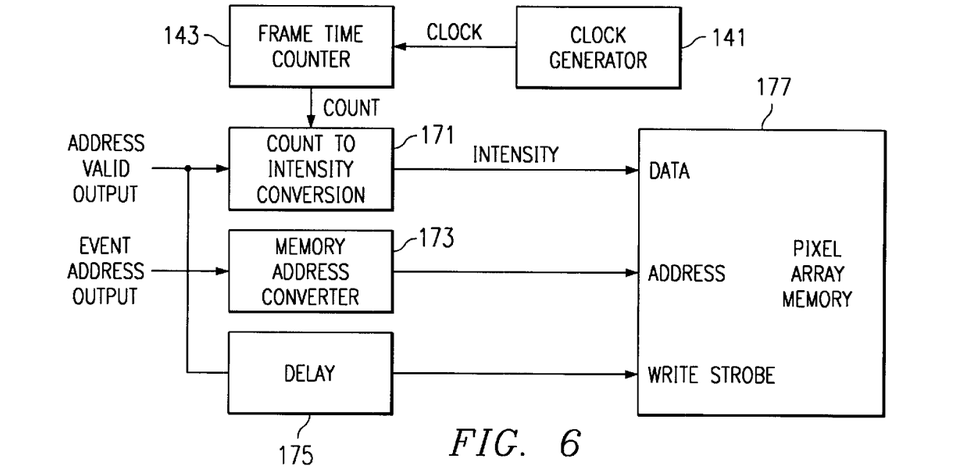
FIG. 6 illustrates example hardware storing the pixel data of the imager of FIG. 4 in a pixel array memory.

FIG. 6 illustrates hardware for conversion of the series of event address outputs and their corresponding address valid outputs into a pixel map of pixel intensities. Clock generator 141 and frame time counter 143 are as described above.

Count to intensity conversion unit 171 converts the count to pixel intensity. As illustrated in FIG. 3, the count, corresponding to the firing time of the pixel, is inversely proportional to the pixel intensity. This inverse relationship may be linear or nonlinear depending upon the reference voltage function. If this inverse relationship is linear or if it can be approximated in a closed form, the conversion may be made by computation in a digital signal processor. In this event, count to intensity conversion unit 171 may be embodied in a time slice of the computational capacity of a digital signal processor. Alternately, the closed form conversion may be performed by special purpose hardware constructed for the particular imager 100. Count to intensity conversion unit 171 may use a lookup table memory. The count is used as an address to recall a corresponding pixel intensity. This may be useful if a closed form formula is not available or is too complex to use. The lookup table may use only a selected number of most significant bits of the count. This effectively quantizes the pixel intensity values and also reduces the amount of memory required to implement the lookup table.

Regardless of the implementation, count to intensity conversion unit 171 must be able to keep up with the fastest expected rate of production of event address outputs and address valid outputs. This is necessary to prevent loss of data. This fastest rate corresponds to the smallest resolvable times of row arbiter 121 and column arbiter 131. Count to intensity conversion unit 171 may be constructed fast enough to maintain this rate. Alternatively, corresponding counts and event address outputs may be buffered in a first-in-first-out memory. The size of the first-in-first-out memory must be selected with regard to the maximum data rate, the worse case expected cluster of event address outputs and address valid outputs pairs and the rate of operation of count to intensity conversion unit 171 to prevent overflow.

Pixel array memory 177 stores intensity data in memory locations corresponding to respective pixels. Pixel array memory 177 serves as picture array or frame buffer. For each address valid output, the corresponding intensity data and event address output are presented to respective inputs of pixel array memory 177. Pixel array memory 177 is triggered by each valid address output to store the intensity data in a memory location corresponding to the event address output. Note it is possible to provide some memory address conversion by memory address converter 173 to match the pixel location of the event address output to the particular portion of memory used in pixel array memory 177. Depending upon the speed of operation of count to intensity conversion unit 171, the address valid outputs and the event address outputs may need to be delayed in delay unit 175 to ensure time correspondence.

It may be advantageous to employ two pixel maps within pixel array memory 177. According to this invention, pixel intensity data is loaded into pixel array memory 177 in order of pixel intensity from the greatest intensity to the least intensity. Additionally, pixel intensity data may be received and stored during any portion of the exposure interval. Accordingly, there is no time during the exposure interval when memory access for read-out and utilization can be guaranteed. For a digital still camera, this limitation would present little problem. The pixel data can be read-out and utilized between exposures. The interval between exposure will typically be much larger than the exposure interval, providing ample time for this task. For a video camera the interval between exposures may not be adequate for read-out and utilization of the data. In this event, an odd/even frame toggle of a most significant bit of the address supplied to pixel array memory 177 could be used to switch between two memory areas. During a first frame exposure, the hardware illustrated in FIG. 6 will fill a first memory area with pixel intensity data. At the same time the second memory area, storing pixel intensity data of the immediately prior frame is available for read-out and utilization. At the completion of a frame exposure interval, the two memory areas are switched in use.

Figure 7:
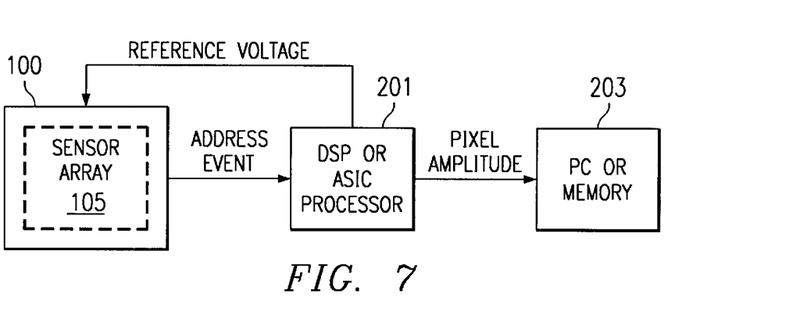
FIG. 7 illustrates a typical system including the imager of this invention.

FIG. 7 illustrates a typical system including imager 100. Imager 100 including senor array 105 generates address event signals as described above. These address event signals are supplied to processor 201. Processor 201 may be a digital signal processor (DSP) or an application specific integrated circuit (ASIC). Processor 201 generates the reference voltage for supply back to imager 100. This reference voltage has the form illustrated in FIG. 3, decreasing from a maximum level at the minimum exposure time to a value just above the signal to noise threshold at the maximum exposure time. Processor 210 converts the address event signals into a pixel amplitude array corresponding to the pixels of sensor array 105. These pixel amplitude signals are supplied to utilization device 203, which may be a personal computer (PC) or a memory. As an example, a digital still camera will typically store each picture as pixel amplitude/color array in a memory. The memory typically is removable so that the pictures can be loaded into a personal computer to view or print.

An exemplary design of imager 100 has 25 transistors for each pixel. SPICE simulations show that this imager can achieve a dynamic range of more than 120 dB in video mode with an integration time of 30 ms by varying the reference voltage.

The imagers power consumption is extremely low. The static power consumed by the comparators is the major source of power consumption. To minimize this static power, in the preferred embodiment each comparator operates in the sub-threshold region and consumes about 60 nW of power. This results in a total static power consumption of about 1.5 mW for a QCIF-sized (176×144) imager. Unlike the prior art multiple sampling imager and the address event representation imager, each comparator only inverts once per frame. Thus each pixel outputs a pulse event only once per frame. Therefore, the dynamic power consumption of this imager is much lower than the multiple sampling and address event imagers. The dynamic power of this image is estimated to be less than 0.1 mW for a QCIF format.

Fixed pattern noise due to device mismatches is one of the major reasons for the inferior performance of CMOS imagers compared to CCD imagers. Because the time difference between two pixels firing is related to the difference in pixels illuminance, it is important to minimize comparator offsets due to transistor mismatches. An auto-zeroing circuit inside each pixel greatly reduces the comparator's offset caused by transistor mismatches. Without auto-zeroing, the comparator offset is about 50 mV when there is a 25% mismatch between the lengths of the two input transistors. Auto-zeroing reduces the offset to about 0.50 mV.

The speed of row arbiter 121 and column arbiter 131 greatly affects the noise introduced by conflicting pixel firings when many pixels are under uniform illumination. In the current design, row arbiter 121 and column arbiter 131 can resolve pixels in an average output cycle time of 40 ns if the conflicts are among pixels in different rows and 5 ns if the conflicts are among pixels in the same row. As stated above under reasonable assumptions, this arbiter performance corresponds to a maximum digital pixel value error of 0.1% if the uniformly illuminated pixels are in the darkest illuminance range of the pixels and a maximum error of 8% if the uniformly illuminated pixels are in the median illuminance range of the pixels.

An advantage of this invention as compared to digital processing is that this invention can perform some image processing functions more efficiently. This invention can obtain an image histogram with no additional computation. This invention enables image processing by simply adjusting the mapping from the time domain from the counter to the amplitude domain.

What is claimed is:

1. An image sensor comprising:
    a plurality of pixel cells disposed in a two-dimensional array of M rows and N columns, each of the pixel cells containing a photodiode and a comparator circuit, each comparator circuit having a first input terminal connected to the corresponding photodiode and a second input terminal receiving a common reference voltage, each comparator circuit delivering a comparator pulse when an analog signal from the photodiode equals the reference voltage;
    a set of M row lines, each row line connected to said comparator circuit of each pixel cell of a corresponding row of pixel cells;

a set of N column lines, each column line connected to said comparator circuit of each pixel cell of a corresponding column of pixel cells;

a row arbiter operable during a predetermined exposure interval having M inputs, each input connected to a corresponding one of said M row lines, said row arbiter
  detecting when a row line receives a comparator pulse from a pixel cell in said corresponding row,
  generating a row signal indicative of said row, said row arbiter selecting a single row if more than one row line receives a comparator pulse, and
  enabling said comparators of pixel cells in said selected row to send said comparator pulses to said corresponding column lines;

a column arbiter operable during said predetermined exposure interval having N inputs, each input connected to a corresponding one of said N column lines, said column arbiter
  detecting when a column line receives a comparator pulse from a pixel cell in said corresponding column,
  generating a column signal indicative of said column, said column arbiter selecting a single column if more than one column line receives a comparator pulse,
  generating an address valid signal when said column signal is valid; and conversion hardware operable during said predetermined exposure interval, said conversion hardware converting a time of arrival of an address valid signal during the exposure interval into an illumination level of said corresponding pixel cell.

2. The image sensor of claim 1, further comprising:
a row encoder receiving said row signal from said row arbiter, said row encoder generating a multibit digital row signal indicative of said row corresponding to said row signal; and
a column encoder receiving said column signal from said column arbiter, said column encoder generating a multibit digital column signal indicative of said column corresponding to said column signal.

3. The image sensor of claim 2, wherein:
said column encoder further generates said address valid output when said multibit column signal is valid;
said image sensor further comprising:
  a histogram interval timer generating at least two interval reset signals at times corresponding to predetermined pixel intensity during said exposure interval;
  a counter connected to said column encoder for counting said address valid outputs and connected to said histogram interval timer for resetting upon receipt of an interval reset signal during said exposure interval; and
  a first-in-first-out memory connected to said histogram interval timer and said counter for storing said count of said counter in a first memory location upon receipt of an interval reset signal.

4. The image sensor of claim 3, wherein:
said histogram interval timer includes
  a clock generator generating periodic clock pulses;
  a frame time counter connected to said clock generator counting clock pulses during said exposure interval;
  a plurality of registers, each storing a count within a range of said frame time counter;
  a plurality of comparators, each comparator having a first input receiving a count from said frame time counter and a second input receiving said count stored within a corresponding one of said plurality of registers;
  said histogram interval timer generating an interval reset when any of said plurality of comparators detects a match between said count of said frame time counter and said count stored in said corresponding register.

5. The image sensor of claim 2, wherein said conversion hardware comprising:
a clock generator generating periodic clock pulses;
a frame time counter connected to said clock generator counting clock pulses during said exposure interval;
a count to intensity conversion unit receiving said count of said frame time counter and said address valid output of said column encoder, said count to intensity conversion unit
  sampling said count of said frame time counter upon receipt of each address valid output, and
  converting said sampled count into pixel intensity data; and
a pixel array memory having a data input receiving pixel intensity data from said count to intensity conversion unit, an address input connected to said row encoder receiving said multibit digital row signal and to said column encoder receiving said multibit digital column signal, and a write strobe input connected to said column encoder receiving said address valid signal, said pixel array memory storing said pixel intensity data at a memory location corresponding to said multibit digital row signal and said multibit digital column signal upon each receipt of an address valid signal.

6. The image sensor of claim 1, further comprising:
a reference voltage generator generating said reference voltage, said reference voltage generator generating a voltage monotonically changing from a voltage indicative of maximum illumination at a time corresponding to a minimum exposure time to a voltage just above a signal to noise ratio at a time corresponding to a maximum exposure time.

7. The image sensor of claim 1, wherein:
each pixel cell of said plurality of pixel cells further includes a reset transistor having a source-drain path connected between a source of a predetermined reset voltage and said photodiode and a gate;
said image sensor further comprising a reset generator connected to said gate of said reset transistor of each pixel cell, said reset generator periodically generating a reset signal causing said reset transistors to conduct at time intervals corresponding to a maximum exposure time.

8. A method of image sensing comprising the steps of:
disposing a plurality of pixel cells in a two-dimensional array of M rows and N columns, each of the pixel cells including a photodiode and a comparator circuit, each comparator circuit having first input terminal connected to the corresponding photodiode and a second input terminal receiving a common reference voltage;
during an exposure interval for each pixel cell detecting when a voltage across the corresponding photodiode equals the reference voltage;
during the exposure interval for each pixel cell generating an output pulse at the time the voltage across the corresponding photodiode equaled the reference voltage;
during the exposure interval for each output pulse determining the row and column of the pixel cell generating the output pulse;
during the exposure interval for each output pulse converting the time of generation of the output pulse into data indicative of the corresponding pixel illumination; and during the exposure interval for each output pulse storing data indicative of the corresponding pixel illumination in a memory external to the array of pixel cells at a location corresponding to the row and column of the pixel cell generating the output pulse.

9. The method of claim 8, further comprising the step of:

forming a histogram of pixel intensity by counting each output pulse for each of a plurality of time intervals during the exposure interval.

10. The method of claim 9, further comprising the steps of:

generating a plurality of interval reset signals indicative of an end one of said plurality of time intervals by
counting periodic clock pulses during said exposure interval thereby forming a frame count;
storing a plurality of counts within a range of said frame time counter, each stored count corresponding to an end one of said plurality of time intervals;
generating an interval reset signal upon detection of a match between said frame count and any of said stored counts.

11. The method of claim 8, wherein the step of converting in the time of the output pulse into data indicative of the corresponding pixel illumination comprises:

counting periodic clock pulses during the exposure interval thereby forming a frame count;
sampling the frame count upon each output pulse;
converting each sampled count into data indicative of the corresponding pixel illumination.

12. The method of image sensing of claim 8, further comprising:

generating said reference voltage monotonically changing from a voltage indicative of maximum illumination at a time corresponding to a minimum exposure time to a voltage just above a signal to noise ratio at a time corresponding to a maximum exposure time.

13. The method of image sensing of claim 8, further comprising:

periodically resetting the photodiodes in the pixel cells at time intervals corresponding to a maximum exposure time.

\* \* \* \* \*